(12) United States Patent
Santinato et al.

(10) Patent No.: US 9,837,820 B2
(45) Date of Patent: Dec. 5, 2017

(54) ELECTRONIC SYSTEM FOR POWER CONSUMPTION MANAGEMENT OF APPLIANCES

(75) Inventors: Matteo Santinato, Albignasego (IT); Ettore Arione, Leggiuno (IT); Giorgio Braghini, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 943 days.

(21) Appl. No.: 12/886,618

(22) Filed: Sep. 21, 2010

(65) Prior Publication Data

US 2011/0231788 A1 Sep. 22, 2011

Related U.S. Application Data

(63) Continuation of application No. 10/447,359, filed on May 29, 2003, now abandoned.

(30) Foreign Application Priority Data

May 31, 2002 (EP) ..................................... 02011668

(51) Int. Cl.
G06Q 10/00 (2012.01)
H02J 3/00 (2006.01)
H02J 3/14 (2006.01)

(52) U.S. Cl.
CPC ............... *H02J 3/008* (2013.01); *H02J 3/14* (2013.01); *Y02B 70/3225* (2013.01); *Y04S 20/222* (2013.01); *Y04S 20/224* (2013.01); *Y04S 50/10* (2013.01)

(58) Field of Classification Search
USPC .................... 705/7.35, 7.11, 7.12, 400, 7.22
See application file for complete search history.

(56) References Cited

U.S. PATENT DOCUMENTS

| | | |
|---|---|---|
| 3,925,680 A | 12/1975 | Dixon |
| 4,075,699 A | 2/1978 | Schneider et al. |
| 4,090,088 A | 5/1978 | McMahon et al. |
| 4,168,491 A | 9/1979 | Phillips et al. |
| 4,216,384 A | 8/1980 | Hurley |

(Continued)

FOREIGN PATENT DOCUMENTS

| | | |
|---|---|---|
| DE | 3935102 A1 | 4/1990 |
| DE | 19541869 C1 | 1/1997 |

(Continued)

OTHER PUBLICATIONS

Household Response to Incentive Payment for Load Shifting: A Japanese Time-of-Day Electricity Pricing Experiment.:, Isamu et al, Energy Journal, 21, 1, 73, Jan. 2000.

(Continued)

*Primary Examiner* — Akiba Allen

(57) ABSTRACT

An electronic system for power consumption management of one or more domestic appliances is routinely informed on actual energy tariff through a network control unit or through a predetermined time-table stored in the system. A user interface of the electronic system is provided where the user can set his preference concerning the switch-on time of each appliance and/or function thereof and read the related estimated energy consumption and/or energy cost of the appliance working program.

16 Claims, 3 Drawing Sheets

(56) References Cited

U.S. PATENT DOCUMENTS

| | | |
|---|---|---|
| 4,247,786 A | 1/1981 | Hedges |
| 4,293,915 A | 10/1981 | Carpenter et al. |
| 4,324,987 A | 4/1982 | Sullivan, II et al. |
| 4,336,462 A | 6/1982 | Hedges et al. |
| 4,399,510 A * | 8/1983 | Hicks ............................ 705/412 |
| 4,472,640 A | 9/1984 | Elmer |
| 4,476,398 A | 10/1984 | Hallam |
| 4,612,619 A | 9/1986 | Culp |
| 4,771,185 A | 9/1988 | Feron et al. |
| 4,819,180 A | 4/1989 | Hedman et al. |
| 4,829,159 A | 5/1989 | Braun et al. |
| 4,847,781 A | 7/1989 | Brown, III et al. |
| 4,847,782 A | 7/1989 | Brown, Jr. et al. |
| 4,933,633 A | 6/1990 | Allgood |
| 4,998,024 A | 3/1991 | Kirk et al. |
| 5,017,799 A | 5/1991 | Fishman |
| 5,168,170 A | 12/1992 | Hartig |
| 5,272,585 A | 12/1993 | Gibbs |
| 5,359,540 A | 10/1994 | Ortiz |
| 5,414,640 A | 5/1995 | Seem |
| 5,424,903 A | 6/1995 | Schreiber |
| 5,436,510 A | 7/1995 | Gilbert |
| 5,481,140 A | 1/1996 | Maruyama et al. |
| 5,483,656 A | 1/1996 | Oprescu et al. |
| 5,502,339 A | 3/1996 | Hartig |
| 5,506,790 A | 4/1996 | Nguyen |
| 5,543,667 A | 8/1996 | Shavit et al. |
| 5,544,036 A | 8/1996 | Brown, Jr. et al. |
| 5,572,438 A | 11/1996 | Ehlers et al. |
| 5,579,201 A | 11/1996 | Karageozian |
| 5,581,132 A | 12/1996 | Chadwick |
| 5,659,601 A | 8/1997 | Chelog |
| 5,675,503 A | 10/1997 | Moe et al. |
| 5,754,445 A | 5/1998 | Jouper et al. |
| 5,761,083 A | 6/1998 | Brown, Jr. et al. |
| 5,828,737 A | 10/1998 | Sawyer |
| 5,831,345 A | 11/1998 | Michaud |
| 5,844,326 A | 12/1998 | Proctor et al. |
| 5,880,677 A | 3/1999 | Lestician |
| 6,018,690 A | 1/2000 | Saito et al. |
| 6,018,726 A | 1/2000 | Tsumura |
| 6,028,977 A | 2/2000 | Newsome |
| 6,111,762 A | 8/2000 | Igarashi et al. |
| 6,150,955 A | 11/2000 | Tracy et al. |
| 6,169,964 B1 | 1/2001 | Aisa et al. |
| 6,177,739 B1 | 1/2001 | Matsudaira et al. |
| 6,178,393 B1 * | 1/2001 | Irvin ............................... 703/10 |
| 6,181,985 B1 | 1/2001 | O'Donnell et al. |
| 6,195,018 B1 | 2/2001 | Ragle et al. |
| 6,216,956 B1 * | 4/2001 | Ehlers et al. ................... 236/47 |
| 6,252,883 B1 * | 6/2001 | Schweickart et al. ......... 370/441 |
| 6,301,674 B1 | 10/2001 | Saito et al. |
| 6,329,616 B1 | 12/2001 | Lee |
| 6,369,643 B1 | 4/2002 | Lee et al. |
| 6,487,509 B1 | 11/2002 | Aisa |
| 6,493,643 B1 | 12/2002 | Aisa |
| 6,519,509 B1 | 2/2003 | Nierlich et al. |
| 6,535,859 B1 | 3/2003 | Yablonowski et al. |
| 6,583,521 B1 | 6/2003 | Lagod et al. |
| 6,590,304 B1 | 7/2003 | Manning et al. |
| 6,591,253 B1 * | 7/2003 | Dinkin et al. ................. 705/412 |
| 6,603,218 B1 | 8/2003 | Aisa |
| 6,621,179 B1 | 9/2003 | Howard |
| 6,622,097 B2 | 9/2003 | Hunter |
| 6,624,532 B1 | 9/2003 | Davidow et al. |
| 6,631,622 B1 | 10/2003 | Ghent et al. |
| 6,633,823 B2 | 10/2003 | Bartone et al. |
| 6,681,154 B2 | 1/2004 | Nierlich et al. |
| 6,718,214 B1 | 4/2004 | Schoettle et al. |
| 6,734,806 B1 | 5/2004 | Cratsley, III |
| 6,741,442 B1 | 5/2004 | McNally et al. |
| 6,745,106 B2 | 6/2004 | Howard et al. |
| 6,751,562 B1 | 6/2004 | Blackett et al. |
| 6,795,707 B2 | 9/2004 | Martin et al. |
| 6,839,717 B1 | 1/2005 | Motoyama et al. |
| 6,861,621 B2 | 3/2005 | Ghent |
| 6,862,498 B2 | 3/2005 | Davis et al. |
| 6,868,293 B1 | 3/2005 | Schurr et al. |
| 6,885,915 B2 | 4/2005 | Rehtanz et al. |
| 6,891,478 B2 | 5/2005 | Gardner |
| 6,904,385 B1 | 6/2005 | Budike, Jr. |
| 6,931,003 B2 | 8/2005 | Anderson |
| 6,940,272 B2 | 9/2005 | Niv |
| 6,961,642 B2 | 11/2005 | Horst |
| 6,988,375 B2 | 1/2006 | Bashark |
| 7,010,363 B2 | 3/2006 | Donnelly et al. |
| 7,034,707 B2 | 4/2006 | Aisa |
| 7,039,532 B2 | 5/2006 | Hunter |
| 7,058,524 B2 | 6/2006 | Hayes et al. |
| 7,069,117 B2 | 6/2006 | Wilson et al. |
| 7,110,832 B2 | 9/2006 | Ghent |
| 7,280,893 B2 | 10/2007 | Spool et al. |
| 7,324,876 B2 | 1/2008 | Ying |
| 7,370,013 B1 | 5/2008 | Aziz et al. |
| 7,373,222 B1 | 5/2008 | Wright et al. |
| 7,406,364 B2 | 7/2008 | Andren et al. |
| 7,478,251 B1 | 1/2009 | Diab et al. |
| 7,738,999 B2 | 6/2010 | Petite |
| 2001/0049846 A1 | 12/2001 | Guzzi et al. |
| 2002/0019758 A1 | 2/2002 | Scarpelli |
| 2002/0019802 A1 | 2/2002 | Malme et al. |
| 2002/0162032 A1 * | 10/2002 | Gundersen et al. .......... 713/300 |
| 2003/0036822 A1 | 2/2003 | Davis et al. |
| 2003/0055776 A1 | 3/2003 | Samuelson |
| 2003/0168389 A1 | 9/2003 | Astle et al. |
| 2003/0187550 A1 | 10/2003 | Wilson et al. |
| 2003/0233201 A1 | 12/2003 | Horst et al. |
| 2004/0043754 A1 | 3/2004 | Whewell |
| 2004/0078154 A1 | 4/2004 | Hunter |
| 2004/0083112 A1 | 4/2004 | Horst |
| 2004/0133314 A1 * | 7/2004 | Ehlers et al. .................. 700/276 |
| 2004/0153170 A1 | 8/2004 | Santacatterina et al. |
| 2004/0235451 A1 | 11/2004 | Whewell et al. |
| 2005/0097902 A1 | 5/2005 | Kwon et al. |
| 2005/0116543 A1 | 6/2005 | Merdjan |
| 2005/0280969 A1 | 12/2005 | Reynolds |
| 2005/0280970 A1 | 12/2005 | Reynolds |
| 2006/0060512 A1 | 3/2006 | Astle et al. |
| 2007/0130278 A1 | 6/2007 | Baek et al. |
| 2008/0272934 A1 | 11/2008 | Wang et al. |
| 2009/0187499 A1 | 7/2009 | Mulder et al. |
| 2010/0023174 A1 | 1/2010 | Nagata et al. |
| 2010/0023786 A1 | 1/2010 | Liberman |
| 2010/0101254 A1 | 4/2010 | Besore et al. |
| 2010/0141046 A1 | 6/2010 | Paik |
| 2010/0268579 A1 | 10/2010 | Momoh |
| 2011/0025519 A1 | 2/2011 | Donaldson et al. |
| 2011/0029141 A1 | 2/2011 | Sun et al. |
| 2011/0035071 A1 | 2/2011 | Sun et al. |
| 2012/0078690 A1 | 3/2012 | Harriman et al. |
| 2012/0095606 A1 | 4/2012 | Besore et al. |
| 2012/0095608 A1 | 4/2012 | Murakami et al. |
| 2012/0109392 A1 | 5/2012 | Hanks et al. |
| 2012/0109397 A1 | 5/2012 | Shim et al. |

FOREIGN PATENT DOCUMENTS

| | | |
|---|---|---|
| DE | 19824168 A1 | 2/1999 |
| DE | 19850496 A1 | 5/2000 |
| EP | 0620631 A1 | 10/1994 |
| EP | 1136829 A1 | 9/2001 |
| GB | 2095879 A | 10/1982 |
| JP | 2000214186 A | 8/2000 |
| WO | 0227687 A1 | 4/2002 |
| WO | 03094321 A1 | 11/2003 |

OTHER PUBLICATIONS

Asian Electronics Ltd., Glossary, 2003, pp. 1-6.
http://www.hrm.uh.edu/docs/pdf/Nextel%20Plans.pdf.
Merriam Webster's Dictionary of Synonyms, 1984, Merriam-Webster, Incorporated, p. 13.

(56) References Cited

OTHER PUBLICATIONS

"Utility Control Algorithm", Jan. 1, 1986, vol. 28, issue 8, pp. 3657-3660.
U.S. Appl. No. 10/460,885, filed Jun. 13, 2003; Total Home Energy Management; first named inventor Gale Richard Horst.
U.S. Appl. No. 10/280,902, filed Oct. 25, 2002; Method and Apparatus for Managing Resources of Utility Provider; first named inventor Gale R. Horst.
U.S. Appl. No. 10/757,891, filed Jan. 15, 2004; A Process for Managing and Curtailing Power Demand of Appliances and Components Thereof, and System Using Such Process; first named inventor Gianpiero Santacatterina.
U.S. Appl. No. 11/733,385, filed Apr. 10, 2007; Energy Management System and Method; first named inventor Gale R. Horst.
U.S. Appl. No. 10/447,359, filed May 29, 2003; Electronic System for Power Consumption Management of Appliance; first named inventor Matteo Santinato.
European search report for corresponding EP02011668.7 dated Feb. 27, 2003.

\* cited by examiner

ELECTRONIC SYSTEM FOR POWER CONSUMPTION MANAGEMENT OF APPLIANCES

CROSS REFERENCE TO RELATED APPLICATIONS

The present application is a continuation of U.S. application Ser. No. 10/447,359, filed May 29, 2003, which claims the benefit of European Patent Application No. 02011668.7, filed May 31, 2002, both of which are incorporated herein by reference in their entirety.

BACKGROUND OF THE INVENTION

Field of the Invention

The present invention relates to an electronic system for power/energy consumption management of one or more domestic appliances, which is routinely informed on actual energy tariff through a network control unit.

Description of the Related Art

JP-A-2000214186 discloses a power consumption management apparatus for enterprise with an electronic unit that measures total amount of power consumed by electrical equipment. EP-A-1136829 discloses a process for measuring the energy consumption of a plurality of appliances connected to a power network in which each switching-on or switching-off of each appliance is detected through a specific high frequency signal injected in the network. DE-A-3935102 discloses a process for varying the load on a power system by injecting signals into the system using an audio frequency signal generator.

Daily energy demand isn't flat; peaks of energy are generated during the day which creates variable demand and increases a utility company's charge to consumers. To avoid dangerous blackouts utility companies are searching for ways to smooth energy demand by offering advantages to customers who are able to control their power consumption.

Consequently, it would be advantageous to design a new generation of appliances that are able to manage power consumption with different tariffs on the base of signed power supply contract.

One of the aims of the present invention is to implement a power management system to help the consumer in saving energy and money. Another object of the present invention is to make the user aware of potential energy cost savings in selecting different delayed switch-on times for each appliance. A further object of the present invention is to provide a system which comprises a user interface through which the user may also input a predetermined energy cost saving target referred to a certain fixed time (week, month), the system being able to select the proper times for switching-on the appliances in order to get the energy-savings target.

SUMMARY OF THE INVENTION

The electronic system according to the invention is characterized by the features listed in the appended claims. Thanks to such features, the electronic system according to the invention may:

allow a powerful and direct user interface designed for a simple and easy understanding in using energy profiles and priorities selected by the user;
support customer energy-savings objectives (i.e. elaborate a new plan to save a certain amount in a week);
avoid power shutoff due to energy demand peaks by setting dynamic priorities among products or product functions (i.e. delay defrost to reduce the power consumption); and
manage the appliances in a coordinated way in order to execute the activities defined in a daily/weekly plan (i.e. start the washer to finish at 18:00 and start the dishwasher to finish before 7:00 by using the cheaper tariff)

The electronic system according to the present invention may also be able to interact with the utility company information center (thorough power line or TLC) to routinely collect information about contract terms and restrictions like daily/weekly/monthly/seasonally tariffs, peak limit and/or penalty.

In another embodiment, the electronic system may be able to negotiate with the utility company backend for a possible reduction of energy consumption in front of unplanned lack of power.

The electronic system according to the invention is preferably linked to so called "intelligent plugs" (i.e. plugs which can interrupt electrical supply to appliances on the basis of a specific signal on the power network) in agreement with priorities fixed by the user.

The electronic system may comprise the following hardware subsystems:

display and keyboard: where the user can set his preferences, power priorities, fixed objectives/targets and read the estimated power consumption or warnings of the home appliances;
microprocessor running a power management software;
data transmission device (appl. modem) that permits the data connection with the appliances and intelligent plugs (wireless RF, bluetooth, 812.11b/a, wired and/or power line);
power meter which can be an external device, integral with the network, in order to make possible its installation in a different place (for instance near the main power switch);
optional serial/usb interface to exchange data with a personal computer or telecom modem.

BRIEF DESCRIPTION OF THE DRAWINGS

The present invention will be described in details with reference to the appended drawings in which.

DETAILED DESCRIPTION

Figure 1:
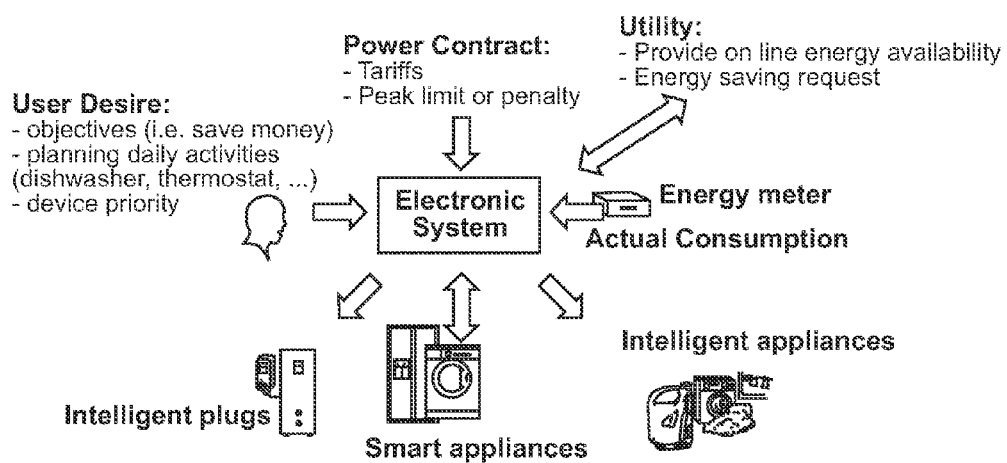
FIG. 1 is a schematic view which shows how the electronic system according to the invention interacts with the user, the appliance and other elements linked by a data transmission network.

With reference to FIG. 1, the power management algorithm which drives the electronic system according to the invention can have two main functionalities identified by the user, an "on line" functionality and a "run time" functionality.

The "on line" functionality supports the customer through the display associated to the electronic system, in defining the initial settings of the system like:

daily/weekly plan for appliances management. The power management algorithm analyses the requests and checks the feasibility taking into account the utility company contract limitations and the appliances energy consumption;

objectives, appliances and function priorities inside appliance. Starting from the user's input the algorithm is able to elaborate and propose a new daily/weekly plan taking into account energy tariffs, utility company contract restrictions and number of appliances present in the network and their energy consumption. In front of any modification, requested by the user, of the proposed plan the algorithm elaborates the impact on the original objectives (for instance an increase of the energy cost);

energy consumption and priority for appliances connected through intelligent plugs.

Figure 2:
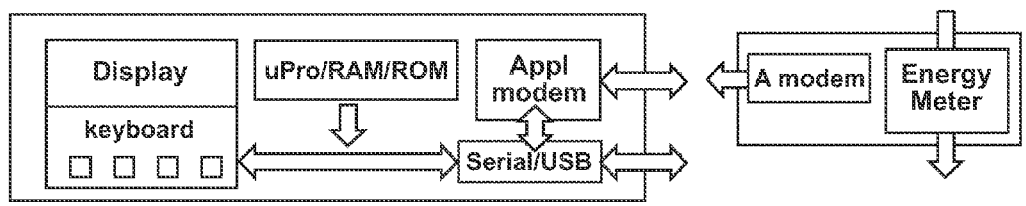
FIG. 2 is a schematic view of a hardware subsystem of the electronic system according to the invention.

The "run time" functionality of the power management algorithm may perform at least the following activities:

continuously process the customer settings and the utility tariffs to re-planning the daily activities at any time it detects a change;

send commands to the appliances in order to complete the daily/weekly plan;

continuously check the energy consumption by means of a meter device belonging to the electronic system to avoid critical situations due to energy consumption peaks that can generate dangerous shutoff. When information on energy consumption is not provided by the network, a device can be used which is formed by an instantaneous energy meter and by an appl. modem (FIG. 2). This latter allows an integration in the electronic system and a possible installation of the device nearby the main power switch. Two critical scenarios are considered:

1) Start of appliance. Each appliance before starting a program cycle asks for the authorization to the power management algorithm. The algorithm checks the actual energy consumption and verifies if the requested energy is available. When the requested energy is not available, the power management algorithm is able to negotiate with the appliance the possibility to run an energy cost saving function or to force the start of an alternative energy cost saving function. An alternative scenario can be that the power management algorithm stops (or pauses) low priority appliances in order to have enough energy to fulfil the request of higher priority device.

2) The energy consumption is higher than the security threshold. When the power management algorithm detects a high level of energy consumption, (over the security threshold), the algorithm may stop or pause the appliances or functions inside appliance with lower priority level. After a defined time and a complete disconnection of the appliances with priority 1, if the energy consumption is not yet below the security threshold the algorithm starts the procedure to start or pause the appliances with priority 2.

Figure 3:
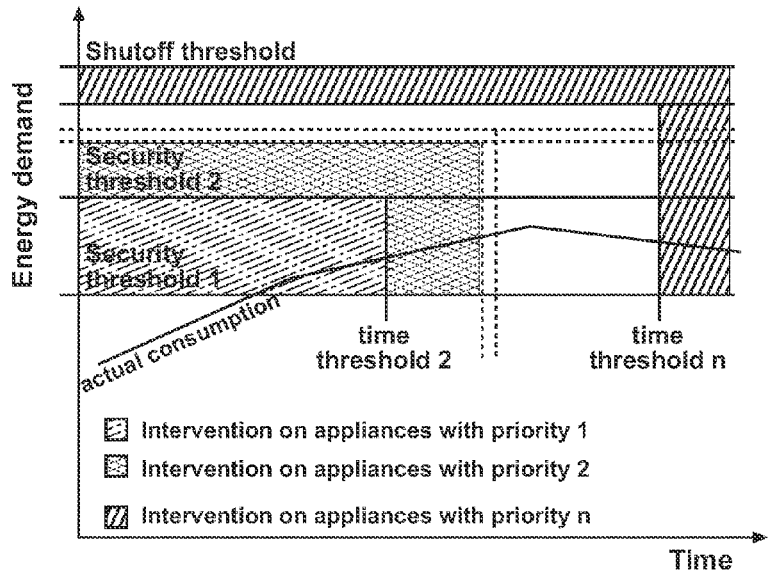
FIG. 3 is a schematic diagram showing a power management model according to the invention.

FIG. 3 shows the area of intervention and the methodology adopted by the power management algorithm to avoid shutoff. The security threshold 1, 2, . . . n are defined by the electronic control system on the basis of the input/targets selected by the user. The time threshold 2 is reached after a predetermined amount of time in which the energy consumption of home appliances is above the security threshold 1. This is due to a normal practice in shutting off if high power consumption level is maintained longer than a predetermined time. This is the reason why of the "L" shape of the zone of security threshold 2 and n.

Figure 4:
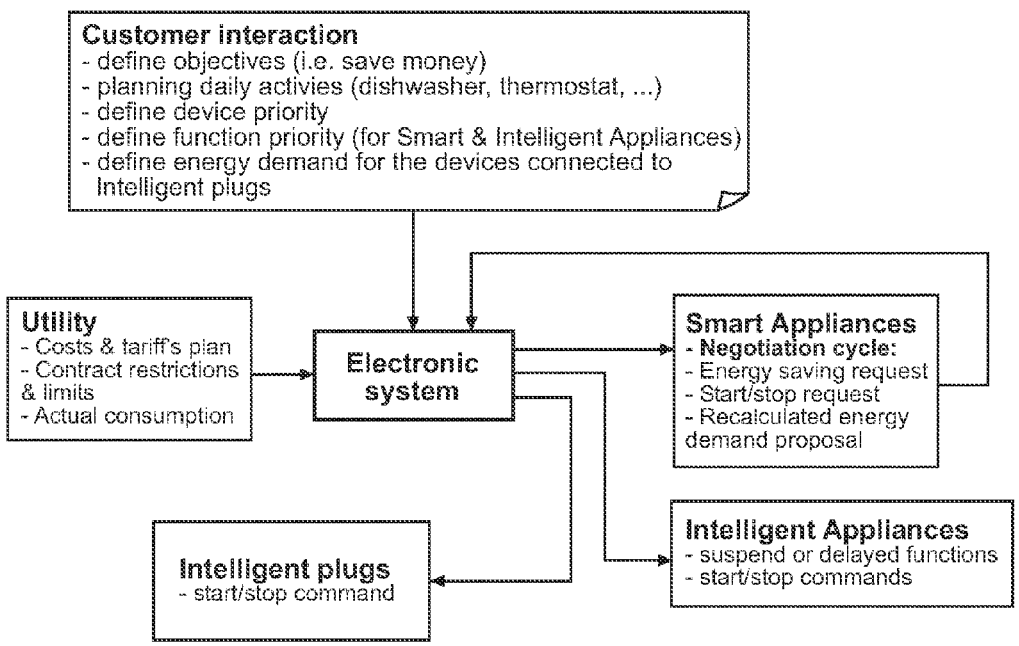
FIG. 4 is a schematic flow-chart showing the data flow of the power management system according to the invention.

As highlighted in FIG. 4 the interaction between the electronic system and the appliances is more or less sophisticated in relation of the "intelligence" of the appliance.

A "smart" appliance with power management (PM) features is able to provide the PM functionality also in a stand-alone mode. In fact in this case, the appliance is able to collect the actual energy consumption and manage the transaction to the status (i.e. normal function, energy cost saving function, pause and delayed start) as required by the energy availability. In addition, the smart appliances with PM features is able to coordinate its interventions with the global management led by the electronic system opening a negotiation cycle to maximize the appliances performances relatively to the available energy.

On the contrary, an "intelligent" appliance without PM features is able to provide the PM functionality only interacting with the electronic system hosted by a "smart" appliance or by a specific stand-alone device. The PM algorithm running in the electronic system is able to drive the appliances not only providing the start, stop and pause command but also running energy cost saving functions.

The electronic system can be used with traditional (or non-intelligent) appliances since these can be controlled by intelligent plugs and can participate actively to the PM process. Each intelligent plug is able to provide on/off functionality and if possible, to drive the energy consumption with continuous power regulation.

The electronic system can host a set of software algorithms that can run on different devices placed in house network or outside but "on line" connected. Examples of "in house" devices are:

An ad hoc intelligent device connected in the home network.

A smart appliance hosting the PM algorithms.

A home gateway or a customer PC.

Alternatively, the PM algorithm can be also distributed on separated devices (for example the "on line" functionality can be on a PC to make easier the user interaction while the "run time" functionality can be hosted inside an appliance).

Warnings and alarms are foreseen every time that the PM algorithm detects a critical event, interacts with the appliances to avoid dangerous situation or finds problems to complete the forecasted daily/weekly energy-saving plan. These messages can be displayed in different ways on different devices for example:

Graphic, alphanumerical and/or sound message for PC, appliance with high level display, gateway or stand alone display connected to the home network;

Warning/alarm code and buzz for appliance equipped with more simple user interface.

When the electronic system is hosted in a "smart" appliance, the related software is essentially composed by:

a NMT (Network Management Tool) program which is able to establish a reliable connection with other devices and find the sources of information that needs, and a "smart application" software that manages the power demand of the appliance by interpreting the energy tariffs and shows the available alternatives to customer on the user interface or by network/remote interrogations.

The NMT program starts at first time the user uses the appliance. This shell announces the appliance to the other smart appliances already working in the house (community)

and integrates itself on the home network environment. The main goal of this software is to maintain the list of smart appliances that are working in the house, built the priority list and share the real time data to other software layers. The main goal of the "smart application" software shell is to avoid power shutdown reducing the instant power consumption before to reach the power peak limit or critical situations.

This application, before starting a working cycle of the appliance, checks if there is enough energy to avoid shutoff and eventually asks to other smart appliances, with lower priority, to reduce their power consumption.

The "smart application" software can support innovative services to increase the customer satisfaction likes:
PxU (Pay for Use) functionality.
Remote maintenance of the appliance.

In the preferred embodiment of the present invention (FIG. 5), the electronic system has a user interface preferably placed in an appliance. Such user interface has been designed to be extremely simple and easy to use. The idea is to add minimal modifications to standard user interface, since two keys are enough: the 'selector' key S and 'remote' key K.

Pressing the 'selector' key on the appliance, the display scrolls through a variety of opportunities showing the corresponding charges (Euro, $/cent or other currency). The user accepts a selection by pressing the usual 'start' key. The appliance will start its working based on the time (the input can be a delay time or the time on which the appliance has to start actually its program) and corresponding charge that was displayed.

The user interface may show the delay or the time when will start the service.

The optional 'remote' key is preferably added to permit the remote control feature and check the status of the appliance from cellular phone or browsing by Internet connection.

Figure 5:
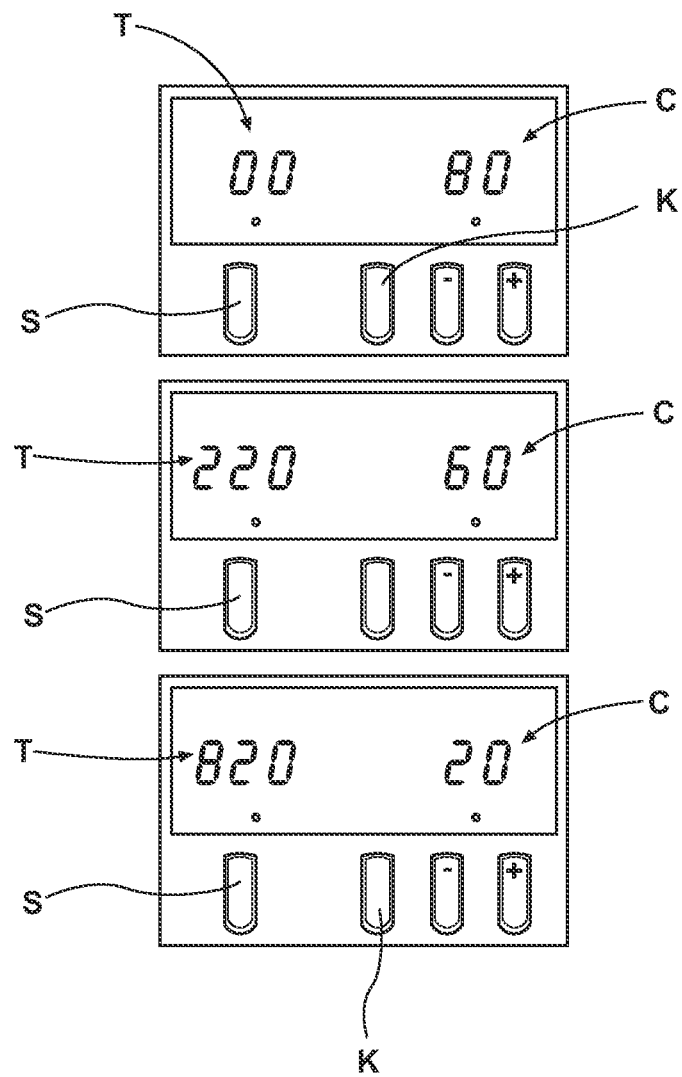
FIG. 5 is an example of user interface used with the electronic system according to the invention.

To explain more in detail the user interface, reference is made to its implementation in a washer (FIG. 5).

The customer sets the washing cycle by turning the program knob of the washer (not shown). Next, the selector key S is pressed and the user interface (UI) shows the charge C if the washing program is started immediately (delay=00—upper part of FIG. 5).

By pressing the selector key S again, the application program evaluates and shows the first alternative to save money.

Middle portion of FIG. 5 suggests to wait 2 hours and 20 min (display T) and to pay 60 eurocents (about $0.70) for the washing cycle. Now, the customer can accept the suggestion by pressing the 'start' key (not shown) or look for a new alternative by pressing the selector key S again.

The new alternative suggests to wait 8 hours and 20 min and to pay only 20 eurocents (about $0.23) for the washing cycle. Again, the customer can accept by pressing 'start' or select the first option by pressing the 'Selector' key again.

If the user presses more times the selector key the display scrolls between the alternatives.

The user accepts a selection by pressing the 'start' key. Then, the appliance will start running based on the time and corresponding charge that was displayed.

The introduction of the home electronic system for power consumption management provides benefits to both the utility company and customer.

The utility company takes advantages mainly from the possibility to interact "on line" with the house controlling actively the energy consumption in order to avoid the peaks and balance the energy demand during the day. This can be done by the utility company in two different interaction levels:

I. By sharing the home energy consumption value and the contract limits forcing the electronic system to maintain the energy demand under the upper limit.

II. By disconnecting more appliances in more houses. The electronic system represents the device to interface the home and negotiate switch off or energy cost saving functions for the connected appliances.

The main customer benefits are:
Avoid shutoff or penalty due to peaks on home energy demand.
Save money planning the use of appliances when energy tariffs are cheaper to exploit all opportunities of energy market deregulation.

The PM system is able to find the best planning taking into account the user needs and the energy cost tariffs imposed by the utility company.

We claim:

1. An electronic system for power consumption management of a domestic appliance having a working cycle, said domestic appliance selected from the group comprising a clothes washing machine, a clothes dryer, a dishwasher, a refrigerator, a freezer, or an ice maker, the system comprising:
a user interface displaying:
the working cycle;
a plurality of switch-on times for the domestic appliance comprising at least a current switch-on time and at least one future switch-on time for the working cycle; and
a current energy cost of executing the working cycle corresponding to the current switch-on time and a future cost of executing the working cycle corresponding to each of the at least one future switch-on times based on actual energy information to define corresponding pairs of switch-on time and energy cost; and
a selector key coupled with the user interface and configured to select one of the plurality of pairs of switch-on time and corresponding energy cost;
wherein a user is able to select a desired switch-on time for the domestic appliance from the plurality of pairs of switch-on time and corresponding energy cost based on a user's cost preference.

2. The electronic system according to claim 1, wherein the user interface further comprises inputting means for setting a predetermined energy cost saving target.

3. The electronic system according to claim 2 wherein the energy cost saving target is displayed as money saved referred to a predetermined time.

4. The electronic system according to claim 1, wherein the system is able to control a total power consumption of a plurality of domestic appliances by setting priorities or time planning among domestic appliances according either to user preferences or to actual energy information.

5. The electronic system according to claim 1, wherein the system is hosted in a specific device connected to a home network.

6. The electronic system according to claim 1, wherein the system is hosted in a domestic appliance connected to a home network.

7. The electronic system according to claim 1, wherein the system is configured to be connected to a device able to interrupt electrical supply to the domestic appliance according to at least one priority selected by the user through the user interface.

8. The electronic system according to claim 1 wherein the actual energy information is obtained through a network control unit or a predetermined time table.

9. An electronic system for power consumption management of a domestic appliance having a working cycle, said domestic appliance selected from the group comprising a clothes washing machine, a clothes dryer, a dishwasher, a refrigerator, a freezer, or an ice maker, the system comprising:
a user interface displaying:
the working cycle;
a plurality of pairs of switch-on times for the domestic appliance and corresponding energy cost for each switch-on time, said plurality of pairs of switch-on times and energy cost comprising:
a current energy cost of executing the working cycle corresponding to a current switch-on time based on actual energy cost information; and
at least one future energy cost of executing the working cycle corresponding to at least one future switch-on time based on actual energy cost information; and
wherein the switch-on time and energy cost of each corresponding pair is simultaneously displayed; and
a selector key coupled with the user interface and configured to select one of the plurality of pairs of switch-on time and corresponding energy cost;
wherein a user is able to select a desired switch-on time for the domestic appliance from the plurality of pairs of switch-on time and corresponding energy cost based on a user's cost preference.

10. The electronic system according to claim 9, wherein the user interface further comprises inputting means for setting a predetermined energy cost saving target.

11. The electronic system according to claim 10 wherein the energy cost saving target is displayed as money saved referred to a predetermined time.

12. The electronic system according to claim 9, wherein the system is able to control a total power consumption of a plurality of domestic appliances in addition to the domestic appliance by setting priorities or time planning among domestic appliances according either to user preferences or to actual energy information.

13. The electronic system according to claim 9, wherein the system is hosted in a specific device connected to a home network.

14. The electronic system according to claim 9, wherein the system is hosted in a domestic appliance connected to a home network.

15. The electronic system according to claim 9, wherein the system is configured to be connected to a device able to interrupt electrical supply to the domestic appliance according to at least one priority selected by the user through the user interface.

16. The electronic system according to claim 9, wherein the actual energy information is obtained through a network control unit or a predetermined time table.

* * * * *